Feb. 11, 1947. H. J. OGORZALY ET AL 2,415,755
APPARATUS FOR CONTACTING SOLIDS WITH GASEOUS FLUID
Filed Sept. 12, 1944 3 Sheets-Sheet 2

Henry J. Ogorzaly
Homer Z. Martin  Inventors
Joseph V. Marancik
By P. H. Young Attorney Feb. 11, 1947.  H. J. OGORZALY ET AL  2,415,755
APPARATUS FOR CONTACTING SOLIDS WITH GASEOUS FLUID
Filed Sept. 12, 1944  3 Sheets-Sheet 3

Henry J. Ogorzaly
Homer Z. Martin  Inventors
Joseph V. Marancik
By ____ Young Attorney Patented Feb. 11, 1947

2,415,755

UNITED STATES PATENT OFFICE 2,415,755

APPARATUS FOR CONTACTING SOLIDS WITH GASEOUS FLUID

Henry J. Ogorzaly, Summit, and Homer Z. Martin and Joseph V. Marancik, Roselle, N. J., assignors to Standard Oil Development Company, a corporation of Delaware Application September 12, 1944, Serial No. 553,730

6 Claims. (Cl. 23—288)

This invention relates to apparatus adapted for stripping entrained volatile material from solid particles.

In certain catalytic operations, gases or vapors are entrained with solid contact or catalyst particles and it is desired or preferred practice to remove such vapors or gases from the solid contact or catalyst particles either before using them in another contacting step or before regenerating them before using them over again in another contacting step. Our invention will be specifically described in connection with the catalytic cracking of hydrocarbons but it is to be understood that the invention is not limited thereto but may be used in other catalytic processes or in other catalytic conversions of hydrocarbons where it is desired to remove vapors or gases from dense fluidized liquid-simulating mixtures of solid particles and gaseous fluid.

In the improved design of catalytic cracking units, the divided catalyst or contact particles are maintained in a dense dry fluidized liquid-simulating condition in the lower portion of the reaction zone wherein hydrocarbons in vapor or gas form are contacted with the solid particles. The hydrocarbon vapors or gases pass upwardly through the dense fluidized mixture in the reaction zone and the vaporous reaction products are taken overhead from the reaction zone.

During the catalytic cracking of hydrocarbons, coke or carbonaceous material is deposited on the catalyst or contact particles and the particles are contaminated or spent and must be regenerated before being used in another cracking operation. The regeneration is usually carried out in the presence of a regenerating gas such as air and the combustible material is burned off. The spent or contaminated contact or catalyst particles are withdrawn as a dense fluidized mixture from the bottom of the reaction zone.

The spent contaminated catalyst or contact particles withdrawn from the bottom portion of the reaction zone contain entrained hydrocarbon vapors or gases and before regenerating the particles, it is preferred practice to remove the entrained hydrocarbons in a stripping or purging step to recover these hydrocarbons and to reduce the amount of burning necessary in the regeneration zone. The present invention relates to an improved design for a stripping or purging section or zone in such a reaction zone.

The mixture of catalyst or contact particles and the hydrocarbons or other reactants are introduced into the bottom portion of a reaction zone through a hollow conical member or chamber provided with a distribution plate member. Surrounding the conical member is an annular space formed by a sleeve spaced from the inner wall of the reaction vessel. This sleeve extends a distance above and below the distribution plate member to form an annular stripping section adjacent the distribution plate member at the bottom portion of the reaction vessel.

The annular stripping section is subdivided into a plurality of parallel elongated sections by radial baffles of substantially the same length as the sleeve above mentioned. The baffles form a plurality of separate vertically arranged narrow and long stripping or purging sections. Steam or other stripping gas is introduced into the bottom portion of each stripping section. It has been found that the ratio of the length to the effective diameter of the stripping section should be high and subdividing the annular stripping space into a plurality of long narrow sections provides such an arrangement with resultant improved stripping.

The space below the conical inlet member is nearly completely closed by a lower spaced conical member to reduce the volume below the conical inlet member and to thereby reduce the holding time of the catalyst particles in the stripping section. In the catalytic cracking of hydrocarbons, the contaminated catalyst or contact particles are at a high temperature and prolonged holding of the mixture at this high temperature in the presence of steam, which is the preferred stripping and fluidizing gas, results in a significant loss of activity.

Provision is made for maintaining the space between the conical inlet member and the lower spaced conical member substantially clear of dust by extending a pipe or tube into the space and releasing a purging gas into this space.

Figure 1:
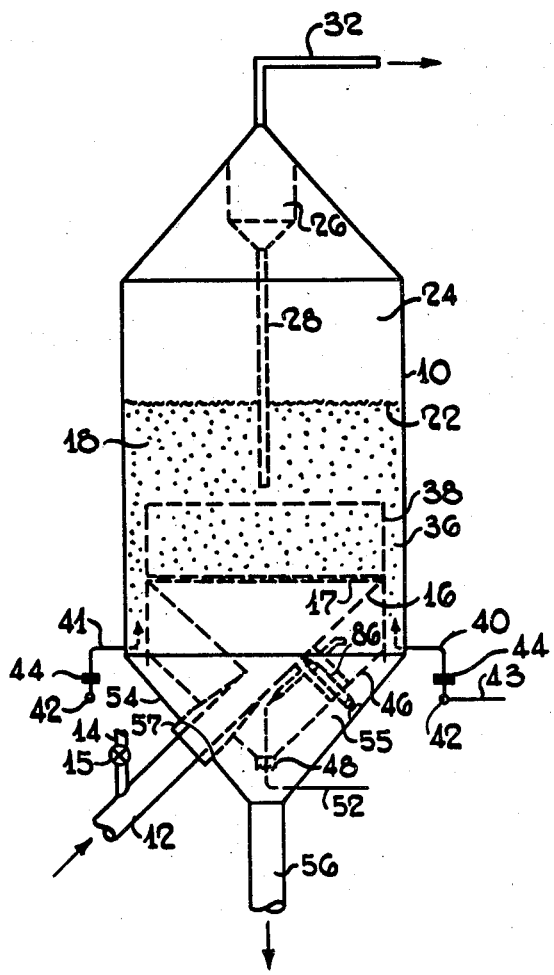
Fig. 1 represents a front elevation of a reaction vessel provided with our improved stripping section.

Referring now to Fig. 1 of the drawings, the reaction vessel 10 will be generally described and then a more detailed description of the stripping section will be taken up in connection with the remaining figures. The reaction vessel 10 is provided with an inlet line 12 for introducing a mixture of reactants and catalyst or contact particles. The solid particles are introduced into line 12 from standpipe or the like 14 provided with a valve 15 for controlling the rate of withdrawal of solid particles from the pipe 14. In the catalytic cracking of hydrocarbons, the reactant fluid comprises hydrocarbons in liquid or vapor form or partly in liquid and partly in vapor form, such as gas oil, reduced crude, petroleum oil, whole crude oil, heavy naphthas, etc.

The catalyst or contact particles in a cracking operation comprise hot regenerated catalyst or contact particles and some of the heat is supplied to the reactants by the hot regenerated catalyst. The suspension of solid particles in gaseous fluid reactants is passed through line 12 into hollow upwardly flared conical inlet member 16 arranged in the bottom portion of the reaction vessel 10. The conical member 16 is provided with a horizontally arranged perforated distribution plate 17 at its upper end. In the form of the apparatus shown in the drawings, the reaction vessel 10 is cylindrical and the perforated distribution plate member or grid is circular and centrally disposed in the vessel 10. The diameter of the distribution member 17 is less than the internal diameter of the reaction vessel 10 to provide an annular space for withdrawing solid particles from the bottom portion of the reaction vessel 10 as will be hereinafter described in greater detail.

The velocity of the gaseous reactant fluid passing upwardly in the reaction zone or vessel 10 is preferably selected to maintain the solid particles in a dense fluidized liquid-simulating dry mixture or bed 18 having a level indicated at 22 with a dilute phase or dilute suspension thereabove designated at 24. As the vaporous reaction products leave the dense bed or mixture 18, they entrain a small amount of solid particles and this suspension comprises the dilute phase designated at 24.

In the catalytic cracking of hydrocarbons, the cracking catalyst comprises acid-treated bentonite clay, synthetic silica alumina or silica magnesia gels or any other suitable cracking catalyst. The catalyst is preferably in powdered or finely divided form in which the particles have a size between about 200 and 400 standard mesh. With such a catalyst the velocity of the gaseous fluid passing upwardly through the dense bed or mixture 18 is about 0.6 ft./second to 2.0 ft./second, and under these velocity conditions, the density of the catalyst particles in the dense bed or mixture 18 is about 10 lbs./cu. ft. to 30 lbs./cu. ft.

The light suspension designated at 24 including the vaporous reaction products is passed through separating means 26 arranged in the upper portion of the reaction vessel 10 to separate most of the entrained solid particles from the vaporous reaction products. The separated solid particles are returned to the dense bed or mixture 18 through line or pipe 28 which extends below the level 22 of the dense bed or mixture 18. The vaporous reaction products leaving the separating means 26 pass overhead through line 32 and may be passed to any suitable equipment to recover desired products.

In the catalytic cracking or conversion of hydrocarbons, the vaporous reaction products are passed to a fractionating system to separate gasoline or motor fuel from gases and higher boiling hydrocarbon constituents. Other forms of separating means may be used or more than one separating means may be used in series for more completely separating the solid particles from the vaporous products leaving the reaction zone or vessel 10.

Arranged around the periphery of the conical inlet member 16 at the lower portion of the reaction vessel 10 is a stripping zone or section generally indicated at 36 which is formed between the inner wall of the vessel 10 and a smaller-diameter concentric vertically arranged sleeve 38 which extends above and below the distribution plate member 17. The upper end of conical inlet member 16 is secured and sealed to sleeve 38 as by welding at 39 (Fig. 2) to prevent leakage around the edge of plate member 17. The stripping zone or section 36 is subdivided into a plurality of parallel vertical stripping sections as will be described in connection with Fig. 2 of the drawings.

Stripping gas, such as steam, flue gas, or other inert gas, is introduced into the lower portion of each stripping section as by feed lines 40 and 41 supplied from an external distributing ring 42 to which the stripping gas is fed by means of line 43. A restricting orifice installed in each individual stripping gas inlet line, as illustrated at 44 in line 40, is employed to give uniform distribution of the stripping gas to each section.

Arranged below the conical inlet member 16 is an upwardly flared conical baffle member 46 which extends from near the bottom of the sleeve 38 to the lower portion of the reaction vessel 10 to reduce the effective volume below the conical inlet member 16. The member 46 is substantially parallel to member 16. The member 46 at its upper end is sealed to the lower portion of sleeve 38 at 47 as by welding. The conical baffle member 46 acts as a closure member to substantially completely shut off the space below the conical inlet member 16. Lower conical member 46 is provided with a small collar 48 at its apex near the bottom of the reaction vessel 10. Collar 48 forms an opening into the space between conical members 16 and 46 and will be described in greater detail hereinafter.

A line or tube 52 is provided for introducing gas into the space between the conical members 16 and 46 to prevent the accumulation of dust in this space. The conical baffle member 46 is spaced from the bottom upwardly flared conical portion 54 of the reaction vessel 10 to provide a space 55 therebetween for conveying stripped or purged catalyst or contact particles from the stripping section 36 to the standpipe 56 leading from the bottom of the reaction vessel 10. Collar 48 is arranged above standpipe 56 and is coaxial therewith.

Surrounding a portion of the inlet member 12 is a conical sleeve 57 which is welded to inlet 12 at cone 16.

Figure 2:
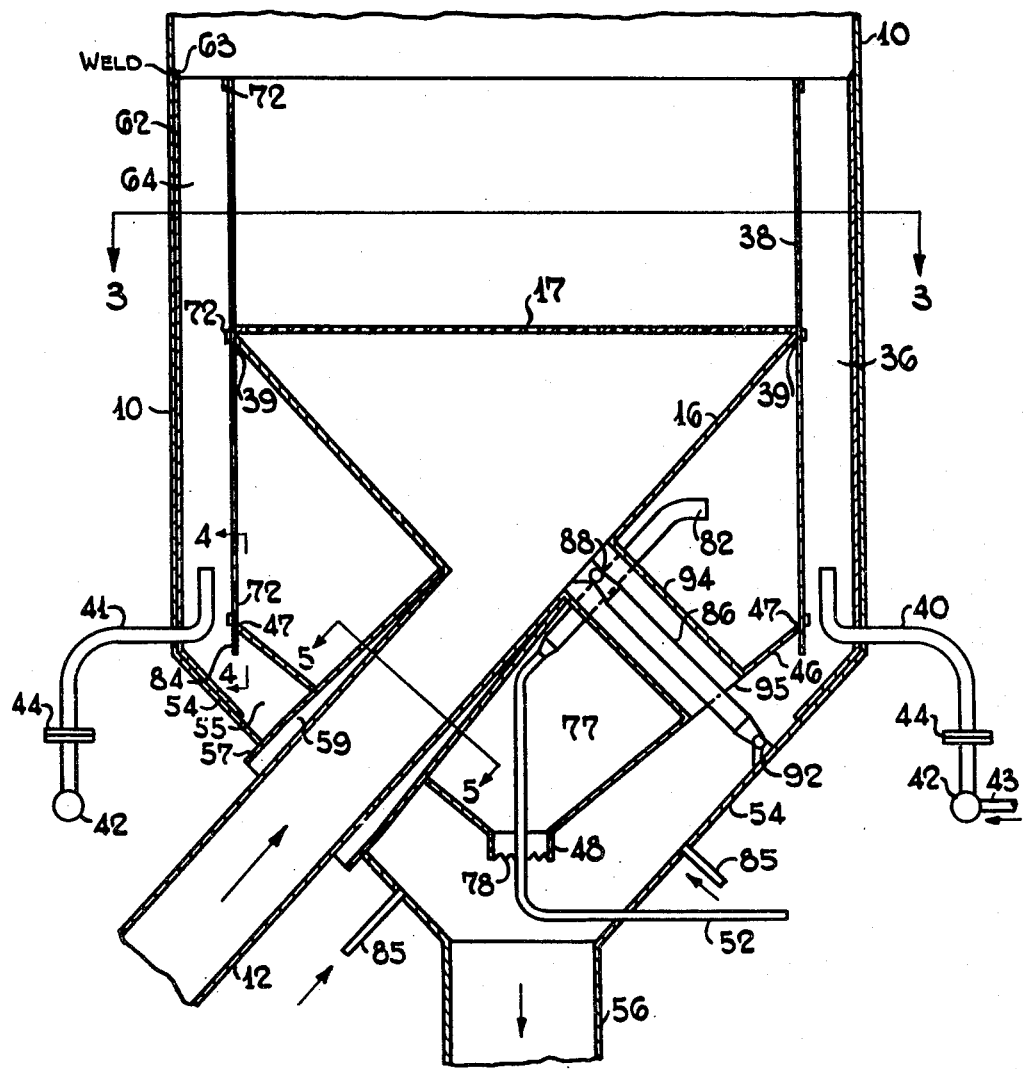
Fig. 2 represents an enlarged longitudinal vertical cross-section of the lower portion of the reaction vessel to show the improved stripping section.
Figure 3:
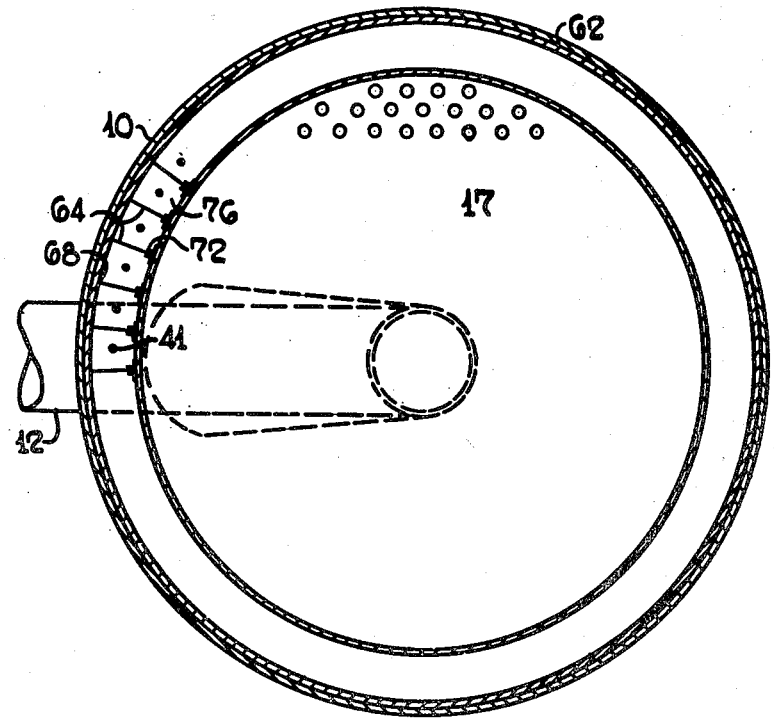
Fig. 3 represents a horizontal transverse cross-section taken substantially on line 3—3 of Fig. 2 and with parts omitted.
Figure 5:
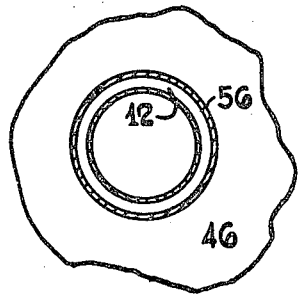
Fig. 5 represents a detail taken substantially on line 5—5 of Fig. 2.

Referring now to Figs. 2 and 3 of the drawings which show a detailed view of the improved stripping apparatus, it will be seen that the reaction vessel 10 is provided with a vertically arranged liner 62 which is fixed to the inner wall of the reaction vessel 10 at the lower portion thereof and is supported by plug welds to the vessel wall. A continuous bead weld is made between the top of the liner 62 and the wall of vessel 10 at 63 to prevent leakage of dust behind the liner. The liner 62 is concentric with the sleeve 38 and is about the same length. The space between the sleeve 38 and the annular liner 62 forms the stripping section generally referred to by the reference character 36 above.

The annular space forming the stripping section is subdivided into a plurality of long and narrow sections by radial baffles 64 (see Fig. 3) which are about as long as the sleeve 38 and extend from the sleeve 38 to the annular liner 62. The outer edge portion of each baffle 64 is welded to the liner 62 as shown at 68 (Fig. 3). The inner edges of the baffles 64 are not welded to the sleeve 38 but are fitted into position between spaced clips 72 which are welded to the inner sleeve member 38.

The baffles 64 subdivide the annular space into individual sections 76. In one form of apparatus in commercial use this stripping section will be subdivided into about 72 sections. The reaction vessel has a diameter of about 23 feet and the annular space 36 is about 16" wide. The baffles 64 are about 12" apart so that the individual sections will be 12" x 16". The length of each stripping section above the point of stripping gas introduction is about 15 ft. The effective diameter of each section 76 is about 1.1 ft. and therefore the ratio of length to diameter is about 13.7. It has been found that high ratios of length to effective diameter give improved stripping and the stripping apparatus embodying our invention gives improved stripping because of the large ratio of length to effective diameter. Substantially all of the stripping is accomplished in stripping sections 76. Some stripping may occur in space 55.

The sleeve 38 in the commercial form of apparatus will extend about 8 ft. above the distribution plate member 17 and about 8 ft. below the distribution plate member 17. By having the sleeve 38 extend above the grid or distribution plate member 17, cracked vapors rather than fresh feed vapors are removed and this is preferred because a given volume of entrained vapors represents a smaller weight of carbon as the cracked vapors have a lower molecular weight.

Each individual cell 76 is provided with an individual bleed or inlet line for stripping gas to insure even distribution of the bulk of the stripping gas to the stripping section. Two of these inlets are shown at 40 and 41. These lines 40 and 41 may be fed from a common manifold or individual feed lines may be used. Where a common manifold is used, identical restricting orifices as above described, are installed in the individual lines to feed substantially the same amount of stripping gas to each individual stripping section.

As above generally described in connection with Fig. 1 of the drawings, the conical baffle member 46 is provided at its lower end or apex with a collar 48 which opens into the space 77 between the conical inlet member 16 and the conical member 46. The member 48 is provided with a notched or serrated lower end 78. Line or pipe 52 passes through the opening in collar 48 and extends to the upper portion of the space 77 between members 16 and 46 and has an opening 82 at its end for introducing gas, such as steam or flue gas, into the space between the conical members 16 and 46 to prevent the accumulation of dust therein. The introduced gas vents through the opening in collar 48 and is evenly distributed to space 55 by the serrated ring 78.

Figure 4:
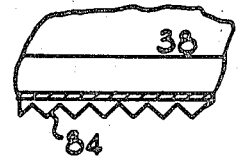
Fig. 4 represents a detail showing the lower portion of the sleeve forming one wall of the stripping section.

The lower portion of the sleeve 38 below point 47 is provided with notches or teeth 84. (See Figs. 2 and 4.) These notches 84 extend down a short distance from about the place of connection 47 of the lower conical member 46 with sleeve 38. The purpose of the notches 84 is to ensure even distribution of gas rising from below into the individual stripping sections or zones. Some of this gas comes from the bleed stream vented into space 77 by line 82; a portion, representing gas used to fluidize solids and aid in stripping, may have been introduced into the standpipe 56 or the lower part of cone 54 as through lines 85; and as the solids pass down through space 55, some additional gas may be liberated by settling of the catalyst to a higher density.

The conical inlet member 16 is supported by a plurality of supports 86 attached at 88 to the inlet member 16 and at the lower end 92 to the cone-shaped bottom 54. Extending between the conical members 16 and 46 and surrounding the upper portion of the support 86 is a sleeve 94 which is open at its lower end 95 for communication with the space 55 in the bottom of the reaction vessel 10.

The space 55 forms a passageway of relatively small volume for conducting the stripped solid particles from the stripping section 36 to the top of the standpipe 56. In previous arrangements, the space below the conical inlet member 16 was open or unobstructed and a large amount of solid particles accumulated and was held up in the bottom portion of the reaction vessel 10 below member 16. The catalyst in this zone is at a high temperature, such that deactivation of the catalyst is encountered in the presence of steam, which is the preferred medium for stripping and fluidizing the catalyst. The present construction reduces the time of this hold-up of solid particles in the bottom portion of the vessel 10 and therefore reduces the amount of deactivation occurring. In the catalytic cracking operations, the spent catalyst is usually fluidized in the space 55 by steam introduced through lines 85.

The operation of the device will now be described in connection with the catalytic cracking of hydrocarbons. Powdered catalyst and relatively heavy hydrocarbon oil, such as gas oil, is passed through the inlet line 12 and the hydrocarbon vapors and powdered material are passed through the distribution plate 17 to form a fluidized dry liquid-simulating mixture 18 in the reaction vessel 10. The temperature during the cracking may vary between about 800° F. and 1000° F. The catalyst to oil ratio may vary between 5 to 1 to 30 to 1 by weight.

During the cracking operation the catalyst particles become spent by the deposition of coke or hydrogen-containing carbonaceous material thereon. The spent or contaminated catalyst particles in fluidized condition and containing entrained hydrocarbon vapors and gases are withdrawn from the dense bed or mixture 18 through the stripping section 36 comprising individual long narrow sections 76. It will be seen that the stripping section 36 extends quite a distance above the distribution plate 17 so that the hydrocarbon vapors and catalyst particles remain in the reaction zone for sometime before the catalyst particles are removed to the stripping section 36, and there is time for cracking to occur and fresh feed vapors are not entrained with the catalyst particles passing to section 36. Stripping gas, such as steam, is then introduced through the individual bleeds or lines 40 and 41, one bleed being provided for each individual stripping section 76.

The amount of spent catalyst passing through the entire stripping section 36 in a commercial unit is about 2000 tons/hour and the amount of steam used is about 15,000 lbs./hour. The steam may be at vaporization temperature of about 350° F. since it is quickly superheated by the catalyst. The velocity of the stripping gas passing upwardly through each individual stripping section 76 is about 1.4 ft./second under these conditions.

It will be noted that lines 40 and 41 extend upwardly into the lower portion of each individual stripping section a short distance to insure upflow of the stripping gas through each stripping section. With long narrow separate stripping sections as disclosed in our new design, improved stripping is maintained. In previous designs about 85% efficiency of removal of entrained hydrocarbon vapors and gases was obtained. With our improved design about 98% efficiency of removal of hydrocarbon vapors and gases is obtained.

While the improved stripping device has been specifically described in connection with the catalytic cracking of higher boiling hydrocarbons to produce gasoline, it is to be understood that the apparatus may be used for removing volatile material from other solid or contact particles in other reactions, such as dehydrogenation of butane or butylene fractions, aromatization of naphtha fractions, coking of heavy residues, and the like, and also may be used generally in other catalytic or non-catalytic reactions involving reactions of organic or inorganic material and not restricted to hydrocarbon material, such as oxidations of organic alcohols to aldehydes or acids, or the preparation of pure anhydrous hydrogen chloride.

The present application is an improvement of the apparatus shown in Ogorzaly application Ser. No. 545,669, filed July 19, 1944.

While we have set forth the best form of apparatus known to us, it is to be understood that this is by way of illustration only and various changes and modifications may be made without departing from the spirit of our invention.

What is claimed is:

1. An apparatus of the character described including a vessel adapted for contacting gaseous fluid and solid particles and having a top outlet for gaseous fluid and a bottom outlet for solid particles, an inlet conduit provided with an expanding conical member provided at its upper end with a horizontally extending perforated plate and arranged in the lower portion of said vessel, said conical member and perforated plate being arranged centrally of said vessel but spaced from the inner wall of said vessel, a vertically extending elongated sleeve concentrically arranged in the lower portion of said vessel and spaced from the inner wall of said vessel, said sleeve extending above and below the top of said conical member and in sealed contact therewith, a plurality of transverse baffles subdividing the space between said sleeve and the inner wall of said vessel into a plurality of elongated, narrow, parallel sections and a plurality of lines for introducing gas into the lower portion of each of said parallel sections whereby solid particles from above the perforated plate and sleeve flow down into said parallel sections countercurrent to the upflowing gas to purge or strip the solid particles of entrained volatile material.

2. An apparatus according to claim 1 wherein a second conical member is arranged below said first conical member and extends downwardly from the bottom portion of said sleeve and in sealed relation therewith to close off the space beneath said first conical member.

3. An apparatus according to claim 1 wherein a second conical member provided with a vent in its lower portion is arranged below said first conical member and extends downwardly from the bottom portion of said sleeve and in spaced relation to and above the bottom of said vessel and means for introducing a gas into the space between said conical members to prevent accumulation of solid particles therein, the space between said second conical member and the bottom portion of said vessel being adapted to conduct fluidized purged solids from the parallel sections to said vessel outlet for solids.

4. An apparatus according to claim 1 wherein a second conical member provided with a vent in its lower portion is arranged below said first conical member and extends downwardly from the bottom portion of said sleeve and in spaced relation to the bottom of said vessel and means for introducing a gas into the space between said conical members to prevent accumulation of solid particles therein, the space between said second conical member and the bottom portion of said vessel being adapted to conduct fluidized purged solids from the parallel sections to said vessel outlet for solids, the lower end of said sleeve being serrated to permit escape of gas liberated from the fluidized solids from below said second conical member to said parallel sections.

5. An apparatus according to claim 1 wherein a second conical member is arranged below said first conical member and extends downwardly from the bottom portion of said sleeve and in sealed relation therewith to substantially completely close off the space beneath said first conical member, and means for introducing a gas into the space between said conical members to prevent accumulation of solid particles therein, the bottom portion of said second conical member being provided with a sleeve or ring having a serrated bottom portion for evenly distributing to the space between said second conical member and the bottom portion of said vessel the bleed gas released within the space between said conical members.

6. An apparatus of the character described including a vessel adapted for contacting gaseous fluid and solid particles and having a top outlet for gaseous fluid and a bottom outlet for solid particles, an inlet conduit for gaseous fluid and solid particles extending through a wall of said vessel and provided with a conical member provided at its upper end with a horizontally extending perforated plate and arranged in the lower portion of said vessel, said conical member and perforated plate being arranged substantially centrally of said vessel but spaced from the inner wall of said vessel, a vertically extending elongated sleeve concentrically arranged in the lower portion of said vessel and spaced from the inner wall of said vessel, said sleeve extending above and below the top of said conical member and being in sealed contact therewith, said sleeve with the inner wall of said vessel forming an annular space adapted for withdrawing fluidized solids from said vessel and communicating at its top with the interior of said vessel at an intermediate region thereof, a plurality of transverse baffles subdividing said annular space into a plurality of elongated narrow, parallel sections and a plurality of pipes for introducing stripping gas into the lower portion of each of said parallel sections, the upper end of each pipe extending into the lower portion of its respective section whereby solids from above said sleeve and perforated plate passing down through said annular space flow countercurrent to the upflowing gas to purge or strip the solids of entrained volatile material.

HENRY J. OGORZALY.
HOMER Z. MARTIN.
JOSEPH V. MARANCIK.

REFERENCES CITED

The following references are of record in the file of this patent:

UNITED STATES PATENTS

| Number | Name | Date |
|---|---|---|
| 2,347,682 | Gunness | May 2, 1944 |
| 2,356,697 | Rial | Aug. 22, 1944 |